United States Patent
Yasuoka et al.

(10) Patent No.: US 8,101,121 B2
(45) Date of Patent: *Jan. 24, 2012

(54) HYDROGEN ABSORBING ALLOY FOR ALKALINE STORAGE BATTERY

(75) Inventors: Shigekazu Yasuoka, Kobe (JP); Jun Ishida, Kobe (JP); Tetsuyuki Murata, Kobe (JP); Hiroshi Nakamura, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 1391 days.

This patent is subject to a terminal disclaimer.

(21) Appl. No.: 10/743,745

(22) Filed: Dec. 24, 2003

(65) Prior Publication Data

US 2004/0134569 A1 Jul. 15, 2004

(30) Foreign Application Priority Data

Dec. 25, 2002 (JP) .................. 2002-374140
Nov. 4, 2003 (JP) .................. 2003-373873

(51) Int. Cl.
*C22C 19/03* (2006.01)
*C22C 19/05* (2006.01)
*H01M 4/13* (2010.01)

(52) U.S. Cl. .................. 420/443; 429/218.2
(58) Field of Classification Search .......... 429/218.2; 420/443
See application file for complete search history.

(56) References Cited

U.S. PATENT DOCUMENTS

| | | | | |
|---|---|---|---|---|
| 5,283,139 A | * | 2/1994 | Newman et al. | 429/224 |
| 5,964,968 A | * | 10/1999 | Kaneko | 148/555 |
| 6,130,006 A | * | 10/2000 | Kohno et al. | 429/223 |
| 6,936,378 B2 | * | 8/2005 | Randell | 429/206 |

FOREIGN PATENT DOCUMENTS

| | | |
|---|---|---|
| CN | 1072268 C | 10/2001 |
| JP | 11-162503 A | 6/1999 |
| JP | 2000-265229 * | 9/2000 |
| JP | 2001-118597 A | 4/2001 |
| JP | 2001-223000 A | 8/2001 |
| JP | 2001-316744 A | 11/2001 |
| JP | 2002-105564 A | 4/2002 |
| JP | 2002-164045 A | 6/2002 |

OTHER PUBLICATIONS

Chartouni et al., "The influence of cobalt on the electrochemical cycling stability of LaNi5-based hydride forming alloys", Mar. 21, 1996, Journal of Alloys and Compounds, pp. 160-166.*
"Crystal Structure of Hydrogen Storage Alloys, La-Mg-Nix(x=3 – 4) System", J. Japan Inst. Metals, vol. 69, No. 1 (2005), pp. 170-178.

* cited by examiner

*Primary Examiner* — Jessee R. Roe
(74) *Attorney, Agent, or Firm* — Kubovcik & Kubovcik

(57) ABSTRACT

A hydrogen absorbing alloy represented by the formula $Ln_{1-x}Mg_xNi_{y-a}Al_a$ (where Ln is at least one element selected from rare earth elements, $0.05 \leq x < 0.20$, $2.8 \leq y \leq 3.9$ and $0.10 \leq a \leq 0.25$) which is used for an alkaline storage battery.

17 Claims, 2 Drawing Sheets

HYDROGEN ABSORBING ALLOY FOR ALKALINE STORAGE BATTERY

FIELD OF THE INVENTION

The present invention relates to an alkaline storage battery and to a hydrogen absorbing alloy that is used for a negative electrode of the alkaline storage battery. More particularly, the present invention relates to an improved hydrogen absorbing alloy for the negative electrode of an alkaline storage battery which extends the cycle life of the alkaline storage battery without decreasing the capacity of the battery.

BACKGROUND OF THE INVENTION

A nickel-cadmium storage battery has been commonly used as an alkaline storage battery. However, a nickel-hydrogen storage battery that uses a hydrogen absorbing alloy for a negative electrode has recently received attention because it has a high capacity as compared to the nickel-cadmium storage battery, and it is excellent from the view point of protecting the environment because it does not use cadmium.

Nickel-hydrogen storage batteries have been used for portable equipment. It is required to improve the batteries so that they are highly efficient.

As an alloy to be used for the negative electrode of a nickel-hydrogen storage battery, a rare earth-nickel hydrogen absorbing alloy having a crystal structure of the $CaCu_5$ type as the main phase, a Laves phase hydrogen absorbing alloy containing Ti, Zr, V and Ni, and the like, have been commonly used.

However, such hydrogen absorbing alloys do not have sufficient hydrogen absorbing capacity, and it is difficult to increase the capacity of the nickel-hydrogen storage battery.

A rare earth-nickel hydrogen absorbing alloy containing Mg, such as an alloy represented by $Ln_{1-x}Mg_xNi_2$ or $Mg_2LnNi_9$, or a hydrogen absorbing alloy containing at least one element selected from Li, V, Nb, Ta, Cr, Mo, Mn, Fe, Co, Al, Ga, Zn, Sn, In, Cu, Si, P and B in addition to Mg has recently been proposed (for example, Japanese Patent Laid-open publication No. 2001-316744).

However, the hydrogen absorbing alloy described above is easily oxidized. When the alloy is used as a negative electrode of an alkaline storage battery, the alloy is easily oxidized by an alkaline electrolyte. Such oxidation consumes the alkaline electrolyte causing a shortage of the electrolyte which increases resistance in the battery and causes a reduction of the cycle life of the battery.

OBJECT OF THE INVENTION

An object of the present invention is to solve the above-described problems of an alkaline storage battery including a rare earth-nickel hydrogen absorbing alloy as a negative electrode. That is, an object of the present invention is to make it possible to improve the cycle life of the battery by an improvement of the rare earth-nickel hydrogen absorbing alloy without deteriorating the capacity of the battery.

SUMMARY OF THE INVENTION

A hydrogen absorbing alloy represented by the formula $Ln_{1-x}Mg_xNi_{y-a}Al_a$ (where Ln is at least one element selected from rare earth elements, $0.05 \leq x < 0.20$, $2.8 \leq y \leq 3.9$ and $0.10 \leq a \leq 0.25$) is used for an alkaline storage battery in the present invention.

Figure 1:
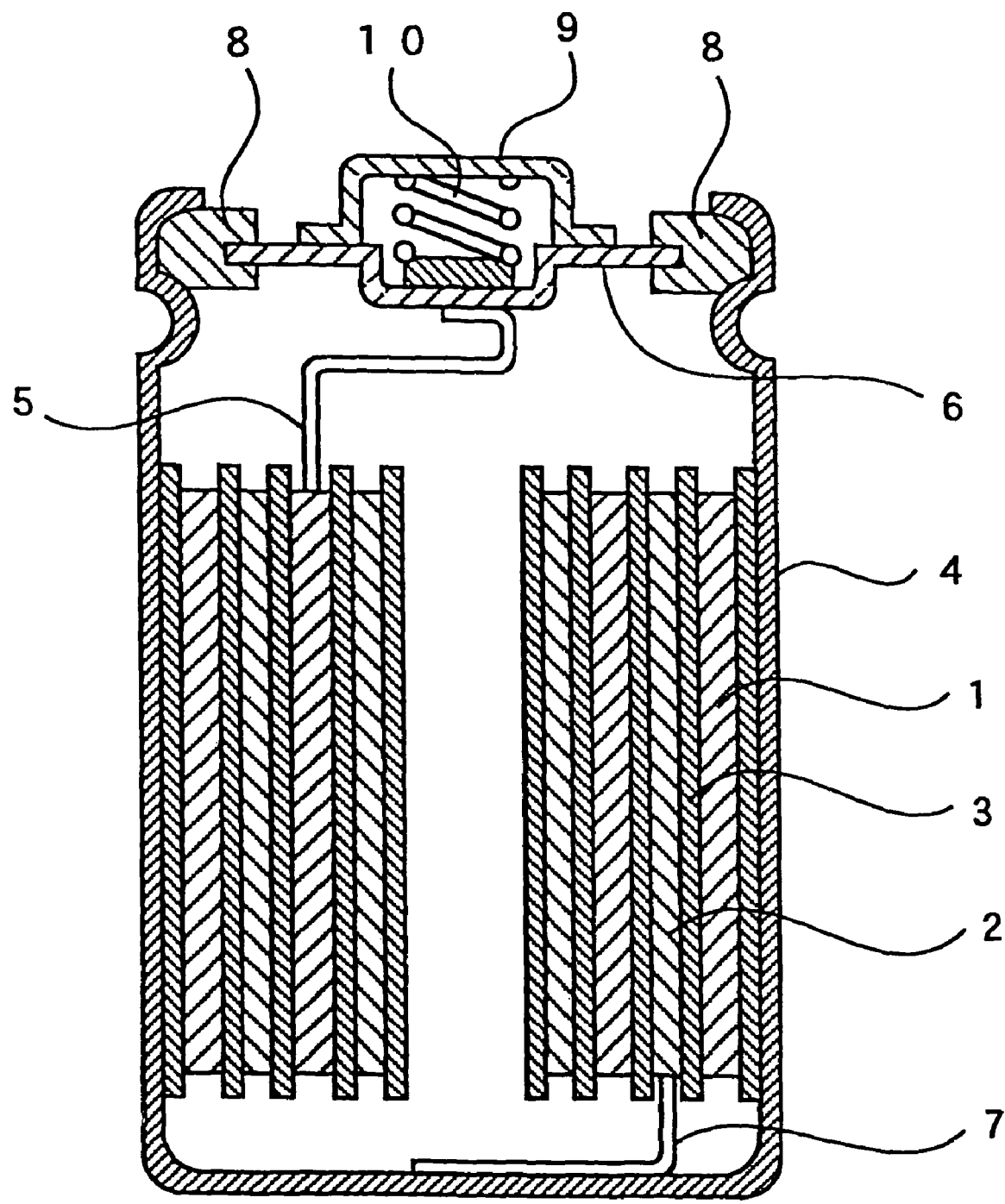
FIG. 1 is a cross section of an alkaline storage battery prepared in Examples 1, 2, 4~17 and Comparative Examples 1, 2 and X.

[Explanation of Elements]
1: positive electrode
2: negative electrode (hydrogen absorbing alloy electrode)
3: separator
4: battery can
5: positive electrode current collector
6: seal plate
7: negative electrode current collector
8: insulation packing
9: positive electrode external terminal
10: coil spring
20: container
21: alkaline electrolyte
22: reference electrode

DETAILED EXPLANATION OF THE INVENTION

When the hydrogen absorbing alloy containing Al in a range described above, in addition to a rare earth element, Ln, Mg and Ni, is used as the negative electrode of an alkaline storage battery, the cycle life of the battery can be improved without a reduction of the capacity of the battery.

In the hydrogen absorbing alloy, the rare earth element can be Y, Sc or a lanthanoid. Especially when Y is used, the effect of increasing the life cycle of the battery is greater. It is preferable that Y is used in a range of 0.03~0.1 mol %.

The reason why the molar ratio of Al ("a") is in a range of 0.10~0.25 is that, if "a" is less than 0.10, the hydrogen absorbing alloy is easily oxidized by the alkaline electrolyte and the alkaline electrolyte is consumed and reduces the cycle life of the battery because of a shortage of the electrolyte. However, if "a" is greater than 0.25, the capacity of the hydrogen absorbing alloy is reduced and the advantage, i.e., high capacity, of the alloy is lost. As a result, an improvement in cycle life cannot be expected because the capacity ratio of the negative and positive electrodes (capacity of the negative electrode/capacity of the positive electrode) is reduced. It is believed that when "a" is greater than 0.25, i.e., when the content of Al is greater, a crystal structure of the alloy changes to reduce the hydrogen absorbing capability.

When a molar ratio ("x") of Mg in the alloy is in a range of $0.05 \leq x < 0.20$, an oxidation resistance and a hydrogen absorbing rate of the hydrogen absorbing alloy are improved.

Furthermore, when a molar ratio ("y") of Ni in the alloy is in a range of $2.8 \leq y \leq 3.9$, a hydrogen absorbing capability of the alloy at a low temperature and charge and discharge cycle characteristics are improved.

If Zr is included in the alloy, cycle life is further improved. A part of rare earth elements, Ln, can be replaced with Zr, when Zr is included in the alloy. For example, an alloy represented by $Ln_{1-x-z}Mg_xZr_zNi_{y-a}Al_a$ (wherein Ln is at least an element selected from rare earth elements, $0.05 \leq x < 0.20$, $2.8 \leq y \leq 3.9$, $0.10 \leq a \leq 0.25$ and $0.01 \leq z$) can be used.

If at least one element selected from V, Nb, Ta, Cr, Mo, Mn, Fe, Co, Ga, Zn, Sn, In, Cu, Si, P and B is contained in the alloy, cycle life of the alkaline storage battery is further improved. Especially when an element selected from In, Cr, Fe and Zn is contained in the alloy, cycle life is especially improved. When Fe or Zn is contained in the alloy, such effect is remarkable. An amount of the element added to the alloy, based on the total amount of Ln and Mg in the formula, is preferably about 0.3 mol %.

As the alloy to which at least one element selected from V, Nb, Ta, Cr, Mo, Mn, Fe, Co, Ga, Zn, Sn, In, Cu, Si, P and B is added, there can be used the alloy described above in which a part of Ni is replaced with the element, i.e., an alloy represented by $Ln_{1-x-z}Mg_xZr_zNi_{y-a-b}Al_aM_b$ (wherein Ln is at least one element selected from rare earth elements, M is at least one element selected from V, Nb, Ta, Cr, Mo, Mn, Fe, Co, Ga, Zn, Sn, In, Cu, Si, P and B, $0.05 \leq x < 0.20$, $2.8 \leq y \leq 3.9$, $0.10 \leq a \leq 0.25$, $0.01 \leq z$ and $0.10 < b \leq 1.95$).

When the alloy contains La in an amount of 10~50 atom % as the rare earth element Ln, the alloy composition is homogeneous and a hydrogen absorbing rate is improved.

There is no limitation with respect to a diameter of particles of the alloy. However, if the diameter is too large, hydrogen absorbing characteristics at the beginning are not good, and if the diameter is too small, the alloy becomes is easily oxidized by an alkaline electrolyte. Therefore, an alloy having an average diameter of 50~200 μm is generally used, and an alloy having an average diameter of 65~200 μm is more preferably used.

In the alkaline storage battery using the hydrogen absorbing alloy for the negative electrode, if an amount of the alkaline electrolyte is increased, it is helpful to keep the electrolyte from being consumed and a shortage being caused. However, internal pressure of the battery becomes high and a valve opens to shorten battery life. Therefore, the amount of the electrolyte based on 1 g of the hydrogen absorbing alloy is preferably not greater than 0.31 ml. Even if the battery uses 0.31 ml or less of the electrolyte per 1 g of the hydrogen absorbing alloy, improved characteristics can be maintained because oxidation of the alloy is prevented and consumption of the electrolyte can be inhibited.

Effects of the Invention

The hydrogen absorbing alloy of the present invention represented by $Ln_{1-x}Mg_xNi_{y-a}Al_a$ (where Ln is at least one element selected from rare earth elements, $0.05 < x < 0.20$, $2.8 < y < 3.9$ and $0.10 \leq a \leq 0.25$) is used for a negative electrode of an alkaline storage battery. The alloy makes it possible to improve the cycle life of the alkaline storage battery without a reduction in the capacity of the alkaline storage battery.

DESCRIPTION OF PREFERRED EMBODIMENTS

Examples of a hydrogen absorbing alloy for an alkaline storage battery and an alkaline storage battery of the present invention are described below and are compared with those of comparative examples to show that an improved cycle life is obtained in the alkaline storage battery of the present invention without reduction of capacity of the battery. It is of course understood that the present invention is not limited to these examples and can be modified within the spirit and scope of the appended claims.

Example 1

[Preparation of Negative Electrode]

A hydrogen absorbing alloy ingot comprising La, Pr and Nd as rare earth elements, Mg, Ni and Al in a mol ratio of 0.17:0.33:0.33:0.17:3.20:0.10 (La:Pr:Nd:Mg:Ni:Al) was prepared in a fusion furnace. The ingot was treated at 1000° C. for 10 hours under an argon atmosphere to prepare an hydrogen absorbing alloy ingot having the formula $La_{0.17}Pr_{0.33}Nd_{0.33}Mg_{0.17}Ni_{3.20}Al_{0.10}$.

Then the ingot was mechanically ground under an inert gas, and was classified to obtain a hydrogen absorbing alloy powder having an average particle diameter of 55 μm.

100 Parts by weight of the hydrogen absorbing alloy, 0.4 part by weight of sodium polyacrylate, 0.1 part by weight of carboxymethylcellulose and 2.5 parts of a 60 weight % polytetrafluoroethylene dispersion were mixed to prepare a paste. The paste was applied on both sides of an electrically-conductive core material comprising a nickel plated punching metal having a thickness of 60 μm, which was pressed after drying and cut to a desired (predetermined) size to prepare, as a negative electrode, a hydrogen absorbing alloy electrode comprising a layer of a hydrogen absorbing alloy having a thickness of 145 μm on both sides of the electrically-conductive core material.

[Preparation of Positive Electrode]

A sintered nickel electrode was used as a positive electrode. The sintered nickel electrode was prepared by a chemical impregnation method by impregnating a nickel sintered substrate having a porosity of 85% in nickel nitrate into which 3 mol % cobalt nitrate and 3 mol % zinc nitrate were added.

[Separator and Electrolyte]

A polypropylene nonwoven fabric was used as a separator. 30% by weight of an alkaline electrolyte containing KOH, NaOH and $LiOH \cdot H_2O$ in a ratio of 8:0.5:1 by weight was used. A cylindrical alkaline storage battery having a designed capacity of 1000 mA as shown in FIG. 1 was assembled.

As shown in FIG. 1, the separator 3 was inserted between the positive electrode 1 and the negative electrode 2 and was spirally rolled, and was placed in a battery can 4. The alkaline electrolyte was poured into the battery can 4 in an amount of 0.31 ml per 1 g of the hydrogen absorbing alloy and the can was sealed after an insulation packing 8 was placed between the battery can 4 and a seal plate 6. The positive electrode 1 was connected to the seal plate 6 through a positive electrode current collector 5, and the negative electrode 2 was connected to the battery can 4 through a negative electrode current collector 7. The battery can 4 and sealing lid 6 were electrically insulated by the insulation packing 8. A coil spring 10 was placed between the seal plate 6 and a positive electrode external terminal 9. The coil spring 10 is compressed and releases gas from inside of the battery to the atmosphere when pressure in the battery unusually increases.

Example 2

A hydrogen absorbing alloy ingot comprising La, Pr and Nd as rare earth elements, Mg, Ni and Al in a mol ratio of 0.17:0.33:0.33:0.17:3.10:0.20 (La:Pr:Nd:Mg:Ni:Al) was prepared in a fusion furnace. After the ingot was prepared, a hydrogen absorbing alloy powder having the formula $La_{0.17}Pr_{0.33}Nd_{0.33}Mg_{0.17}Ni_{3.10}Al_{0.02}$ and an average particle diameter of 55 μm was obtained in the same manner as in Example 1.

An alkaline storage battery of Example 2 was prepared in the same manner as Example 1 except that the hydrogen absorbing alloy powder prepared above was used.

Comparative Example 1

A hydrogen absorbing alloy ingot comprising La, Pr and Nd as rare earth elements, Mg and Ni in a mol ratio of 0.17:0.33:0.33:0.17:3.30 (La:Pr:Nd:Mg:Ni) was prepared in a fusion furnace. After the ingot was prepared, a hydrogen absorbing alloy powder having the formula $La_{0.17}Pr_{0.33}Nd_{0.33}Mg_{0.17}Ni_{3.30}$ and an average particle diameter of 55 μm was obtained in the same manner as in Example 1.

An alkaline storage battery of Comparative Example 1 was prepared in the same manner as in Example 1 except that the hydrogen absorbing alloy powder prepared above was used.

Comparative Example 2

A hydrogen absorbing alloy ingot comprising La, Pr and Nd as rare earth elements, Mg, Ni and Al in a mol ratio of 0.17:0.33:0.33:0.17:3.25:0.05 (La:Pr:Nd:Mg:Ni:Al) was prepared in a fusion furnace. After the ingot was prepared, a hydrogen absorbing alloy powder having the formula $La_{0.17}Pr_{0.33}Nd_{0.33}Mg_{0.17}Ni_{3.25}Al_{0.05}$ and an average particle diameter of 55 μm was obtained in the same manner as Example 1.

An alkaline storage battery of Comparative Example 2 was prepared in the same manner as in Example 1 except that the hydrogen absorbing alloy powder prepared above was used.

Comparative Example X

An alkaline storage battery of Comparative Example X was prepared in the same manner as in Example 1 except that a hydrogen absorbing alloy powder having the formula $La_{0.2}Pr_{4}Nd_{0.4}Ni_{3.78}Mn_{0.3}Cu_{0.8}Al_{0.3}$ and an average particle diameter of 55 μm, obtained in the same manner as Example 1, was used. The hydrogen absorbing alloy represented by $La_{0.2}Pr_{0.4}Nd_{0.4}Ni_{3.78}Mn_{0.3}Co_{0.8}Al_{0.3}$ is commonly used in nickel-hydrogen batteries.

The batteries of Examples 1 and 2 and Comparative Examples 1, 2, and X were charged at 1000 mA for one hour and then discharged to a battery voltage of 1 V at 1000 mA (this charge and discharge cycle is considered one cycle). Charge and discharge of the batteries were repeated three times to obtain a discharge capacity at the third cycle as an initial discharge capacity. The results are shown in Table 1 as an index when the initial capacity of battery X is taken as 100.

Charge and discharge of the batteries were repeated, and the number of cycles to reach 60% of the discharge capacity of the first cycle was measured (wherein discharge at 1000 mA for one hour and discharge to 1 V at 1000 mA as described above is considered to be one charge and discharge cycle). The results of cycle life of each battery are shown in Table 1 as an index when the cycle life of battery X is taken as 100.

TABLE 1

| | Composition of Hydrogen Absorbing Alloy (mol ratio) | | | | | | Initial Discharge Capacity | Cycle Life |
|---|---|---|---|---|---|---|---|---|
| | La | Pr | Nd | Mg | Ni | Al | | |
| Example 1 | 0.17 | 0.33 | 0.33 | 0.17 | 3.20 | 0.10 | 99 | 115 |
| Example 2 | 0.17 | 0.33 | 0.33 | 0.17 | 3.10 | 0.20 | 100 | 118 |
| Comparative Example 1 | 0.17 | 0.33 | 0.33 | 0.17 | 3.30 | — | 102 | 77 |
| Comparative Example 2 | 0.17 | 0.33 | 0.33 | 0.17 | 3.25 | 0.05 | 101 | 100 |
| Comparative Example X | $La_{0.2}Pr_{0.4}Nd_{0.4}Ni_{3.78}Mn_{0.3}Co_{0.8}Al_{0.3}$ | | | | | | 100 | 100 |

The alkaline storage batteries of Examples 1 and 2 in which the electrodes were prepared from the hydrogen absorbing alloy represented by $Ln_{1-x}Mg_xNi_{y-a}Al_a$ (wherein Ln, x, y and a are as defined above) did not decrease in initial discharge capacity and each had an improved cycle life as compared to that of the batteries of Comparative Examples 1, 2 and X.

Example 3

A hydrogen absorbing alloy ingot comprising La, Pr and Nd as rare earth elements, Mg, Ni and Al in a mol ratio of 0.17:0.33:0.33:0.17:3.05:0.25 (La:Pr:Nd:Mg:Ni:Al) was prepared in a fusion furnace. After the ingot was prepared, a hydrogen absorbing alloy powder having the formula $La_{0.17}Pr_{0.33}Nd_{0.33}Mg_{0.17}Ni_{3.05}Al_{0.25}$ and an average particle diameter of 55 μm was obtained in the same manner as in Example 1.

Comparative Example 3

A hydrogen absorbing alloy ingot comprising La, Pr and Nd as rare earth elements, Mg, Ni and Al in a mol ratio of 0.17:0.33:0.33:0.17:3.00:0.30 (La:Pr:Nd:Mg:Ni:Al) was prepared in a fusion furnace. After the ingot was prepared, a hydrogen absorbing alloy powder having the formula $La_{0.17}Pr_{0.33}Nd_{0.33}Mg_{0.17}Ni_{3.00}Al_{0.30}$ and an average particle diameter of 55 μm was obtained in the same manner as in Example 1.

Comparative Example 4

A hydrogen absorbing alloy ingot comprising La, Pr and Nd as rare earth elements, Mg, Ni and Al in a mol ratio of 0.17:0.33:0.33:0.17:2.90:0.40 (La:Pr:Nd:Mg:Ni:Al) was prepared in a fusion furnace. After the ingot was prepared, a hydrogen absorbing alloy powder having the formula $La_{0.17}Pr_{0.33}Nd_{0.33}Mg_{0.17}Ni_{2.90}Al_{0.40}$ and an average particle diameter of 55 μm was obtained in the same manner as in Example 1.

Negative electrodes were prepared using the hydrogen absorbing alloy powders prepared in Examples 1, 2 and 3 and Comparative Examples 3 and 4 and using the alloy having the formula $La_{0.2}Pr_{0.4}Nd_{0.4}Ni_{3.78}Mn_{0.3}Co_{0.8}Al_{0.3}$ used in Example X. 100 parts by weight of each hydrogen absorbing alloy powder and 50 parts by weight of Ni powder were mixed to fabricate a pellet under pressure to prepare the negative electrode.

A cylindrical sintered nickel electrode was used as a positive electrode and 30% by weight potassium hydroxide was used as an alkaline electrolyte.

Figure 2:
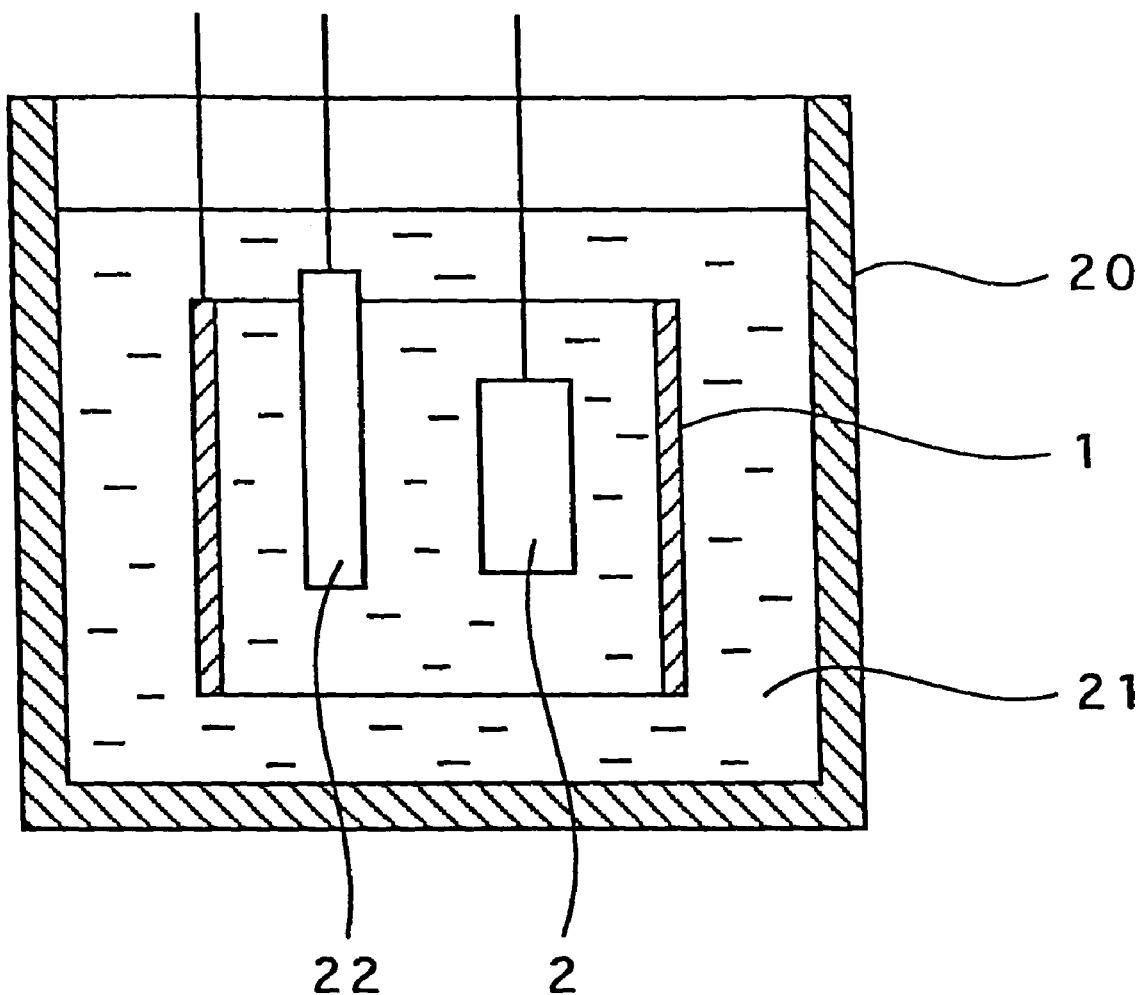
FIG. 2 is a drawing illustrating a test cell prepared to measure maximum capacity in Examples 1~3 and Comparative Examples 3, 4 and X.

As shown in FIG. 2, the alkaline electrolyte 21 was filled in a container 20, the negative electrode 2 was placed inside the cylindrical positive electrode 1, and the negative electrode 2 and the positive electrode 1 were dipped in the alkaline electrolyte 21. An oxidized mercury electrode was also dipped in the alkaline electrolyte as a reference electrode 22.

The cell was charged to 160% of the negative electrode initial capacity at 60 mA/g using the negative electrode 2, and was discharged at 60 mA/g to −0.5 V of a potential of the negative electrode 2 versus the reference electrode 22. Such charge and discharge were repeated five times, and maximum capacity of each negative electrode was measured. The results are shown in Table 2 as an index when the maximum capacity of the negative electrode of Comparative Example X is taken as 100.

TABLE 2

| | Composition of Hydrogen Absorbing Alloy (mol ratio) | | | | | | Maximum Capacity |
|---|---|---|---|---|---|---|---|
| | La | Pr | Nd | Mg | Ni | Al | |
| Example 1 | 0.17 | 0.33 | 0.33 | 0.17 | 3.20 | 0.10 | 110 |
| Example 2 | 0.17 | 0.33 | 0.33 | 0.17 | 3.10 | 0.20 | 109 |
| Example 3 | 0.17 | 0.33 | 0.33 | 0.17 | 3.05 | 0.25 | 105 |
| Comparative Example 3 | 0.17 | 0.33 | 0.33 | 0.17 | 3.00 | 0.30 | 99 |
| Comparative Example 4 | 0.17 | 0.33 | 0.33 | 0.17 | 2.90 | 0.40 | 81 |
| Comparative Example X | $La_{0.2}Pr_{0.4}Nd_{0.4}Ni_{3.78}Mn_{0.3}Co_{0.8}Al_{0.3}$ | | | | | | 100 |

The negative electrode prepared from the hydrogen absorbing alloy represented by $Ln_{1-x}Mg_xNi_{y-a}Al_a$ (wherein Ln, x, y and a are defined above) of Examples 1~3 had increased maximum capacities as compared to the negative electrode of Comparative Example X. However, when a mol ratio of Al ("a") in the alloy is greater than 0.25 (Comparative Examples 3 and 4), the maximum capacity of the negative electrode was equal to or smaller than that of the negative electrode of Comparative Example X. When a maximum capacity is increased such as in Examples 1~3, a capacity ratio between a positive and negative electrodes (capacity of a negative electrode/capacity of a positive electrode) is also increased and cycle life is improved.

Example 4

A hydrogen absorbing alloy ingot comprising La, Pr and Nd as rare earth elements, Zr, Mg, Ni and Al in a mol ratio of 0.17:0.325:0.325:0.01:0.17:3.10:0.20 (La:Pr:Nd:Zr:Mg:Ni:Al) was prepared in a fusion furnace. After the ingot was prepared, a hydrogen absorbing alloy powder having the formula $La_{0.17}Pr_{0.325}Nd_{0.325}Zr_{0.325}Mg_{0.17}Ni_{3.10}A_{0.02}$ and an average particle diameter of 55 μm was obtained in the same manner as in Example 1.

An alkaline storage battery of Example 4 was prepared in the same manner as in Example 1 except that the hydrogen absorbing alloy powder prepared above was used.

Example 5

A hydrogen absorbing alloy ingot comprising La, Pr and Nd as rare earth elements, Mg, Ni, Al and Co in a mol ratio of 0.17:0.33:0.33:0.17:3.00:0.20:0.10 (La:Pr:Nd:Mg:Ni:Al:Co) was prepared in a fusion furnace. After the ingot was prepared, a hydrogen absorbing alloy powder having the formula $La_{0.17}Pr_{0.33}Nd_{0.33}Mg_{0.17}Ni_{3.00}Al_{0.20}Co_{0.10}$ and an average particle diameter of 55 μm was obtained in the same manner as in Example 1.

An alkaline storage battery of Example 5 was prepared in the same manner as in Example 1 except that the hydrogen absorbing alloy powder prepared above was used.

Example 6

A hydrogen absorbing alloy ingot comprising La, Pr and Nd as rare earth elements, Zr, Mg, Ni, Al and Co in a mol ratio of 0.17:0.325:0.325:0.01:0.17:3.00:0.20:0.10 (La:Pr:Nd:Zr:Mg:Ni:Al:Co) was prepared in a fusion furnace. After the ingot was prepared, a hydrogen absorbing alloy powder having the formula $La_{0.17}Pr_{0.325}Nd_{0.325}Zr_{0.01}Mg_{0.17}Ni_{3.00}Al_{0.20}Co_{0.10}$ and an average particle diameter of 55 μm was obtained in the same manner as in Example 1.

An alkaline storage battery of Example 6 was prepared in the same manner as in Example 1 except that the hydrogen absorbing alloy powder prepared above was used.

Initial discharge capacity and the number of cycles to reach 60% of the initial discharge capacity of each alkaline storage battery of Examples 4~6 were measured. The results of cycle life of each battery are shown in Table 3 as an index when the cycle life of battery X is taken as 100.

TABLE 3

| | Composition of Hydrogen Absorbing Alloy (mol ratio) | | | | | | | | Initial Discharge Capacity | Cycle Life |
|---|---|---|---|---|---|---|---|---|---|---|
| | La | Pr | Nd | Zr | Mg | Ni | Al | Co | | |
| Example 4 | 0.17 | 0.325 | 0.325 | 0.01 | 0.17 | 3.10 | 0.20 | — | 100 | 130 |
| Example 5 | 0.17 | 0.33 | 0.33 | — | 0.17 | 3.00 | 0.20 | 0.10 | 99 | 149 |
| Example 6 | 0.17 | 0.325 | 0.325 | 0.01 | 0.17 | 3.00 | 0.20 | 0.10 | 99 | 156 |
| Comparative Example X | $La_{0.2}Pr_{0.4}Nd_{0.4}Ni_{3.78}Mn_{0.3}Co_{0.8}Al_{0.3}$ | | | | | | | | 100 | 100 |

As is clear from the results, when a part of Ln or Ni of the hydrogen absorbing alloy represented by $Ln_{1-x}Mg_xNi_{y-a}Al_a$ (wherein Ln, x, y and a are defined above) is replaced with Zr or Co, respectively, i.e., the alkaline storage batteries of Examples 4~6 had further improved cycle life.

In Examples 5 and 6, a part of Ni was replaced with Co. When V, Nb, Ta, Cr, Mo, Mn, Fe, Ga, Zn, Sn, In, Cu, Si, P or B is used instead of Co, a similar effect can be expected.

Example 7

An ingot of a hydrogen absorbing alloy having the formula $La_{0.17}Pr_{0.33}Nd_{0.33}Mg_{0.17}Ni_{3.10}Al_{0.20}$, the same as Example 1, was prepared in the same manner as in Example 1. Then the ingot was mechanically ground, and was classified under different conditions than Example 1 to obtain a hydrogen absorbing alloy powder having an average particle diameter of 65 μm.

An alkaline storage battery of Example 7 was prepared in the same manner as in Example 1 except that the hydrogen absorbing alloy powder prepared above was used.

Initial discharge capacity and a number of cycles to reach 60% of the initial discharge capacity of the alkaline storage battery of Example 7 was measured. The results of cycle life of the battery are shown in Table 4 as an index when the cycle life of battery X is taken as 100.

TABLE 4

| | Composition of Hydrogen Absorbing Alloy (mol ratio) | | | | | | Average Particle Diameter (μm) | Initial Discharge Capacity | Cycle Life |
| --- | --- | --- | --- | --- | --- | --- | --- | --- | --- |
| | La | Pr | Nd | Mg | Ni | Al | | | |
| Example 1 | 0.17 | 0.33 | 0.33 | 0.17 | 3.20 | 0.10 | 55 | 99 | 115 |
| Example 7 | 0.17 | 0.33 | 0.33 | 0.17 | 3.20 | 0.10 | 65 | 99 | 138 |
| Comparative Example X | $La_{0.2}Pr_{0.4}Nd_{0.4}Ni_{3.78}Mn_{0.3}Co_{0.8}Al_{0.3}$ | | | | | | 55 | 100 | 100 |

As is clear from the results, the alkaline storage battery of Example 7 prepared from the hydrogen absorbing alloy powder having an average particle diameter of 65 μm had further improved cycle life as compared to the battery of Example 1 prepared from the hydrogen absorbing alloy powder having an average particle diameter of 55 μm.

Example 8

A hydrogen absorbing alloy having the formula $La_{0.17}Pr_{0.33}Nd_{0.33}Mg_{0.17}Ni_{3.10}Al_{0.20}$, the same as Example 1, was prepared in the same manner as in Example 1. A hydrogen absorbing alloy powder having an average particle diameter of 65 μm was prepared from the alloy. A hydrogen absorbing alloy electrode was prepared in the same manner as in Example 1 except that the hydrogen absorbing alloy powder having an average particle diameter of 65 μm was used.

Nickel hydroxide powder containing 2.5% by weight of zinc and 1.0% by weight of cobalt was added into a cobalt sulfate solution, 1 M sodium hydroxide was dropped with stirring and reaction was continued with adjusting of the pH to a pH of 11. A precipitate was filtered and was washed with water and was dried in a vacuum to obtain nickel hydroxide powder having a surface coated with 5% by weight cobalt hydroxide.

The nickel hydroxide powder coated with cobalt hydroxide was dipped in a 25% by weight sodium hydroxide solution, treated by stirring at 85° C. for eight hours, and washed with water to obtain a powder of a positive electrode active material after drying at 65° C.

50 Parts by weight of 0.2% by weight hydroxypropyl cellulose as a binding agent was added to a mixed powder of 95 parts by weight of the powder of the positive electrode active material, 3 parts by weight of zinc oxide and 2 parts by weight of cobalt hydroxide to prepare a slurry.

The slurry was filled in pores of nickel foam having a surface density of about 600 g/m², a porosity of about 95% and a thickness of about 2 mm. The nickel foam filled with the slurry was rolled with pressure and was cut to a desired size to prepare a positive electrode comprising a nonsintered nickel electrode having a positive electrode active material density of about 2.9 g/cm³—void.

A cylindrical alkaline storage battery of Example 8 was prepared in the same manner as Example 1 except that the positive and negative electrodes prepared above were used. The designed capacity was 1500 mAh.

Example 9

A hydrogen absorbing alloy having the formula $(La_{0.19}Pr_{0.384}Nd_{0.384}Zr_{0.009}Y_{0.029})_{0.835}Mg_{0.165}Ni_{3.01}Al_{0.19}Co_{0.1}$ was prepared in the same manner as in Example 1 for use in a negative electrode except that the hydrogen absorbing alloy powder had an average particle diameter of 65 μm. An alkaline storage battery was prepared in the same manner as in Example 8 except that the hydrogen absorbing alloy powder of this example was used.

Example 10

A hydrogen absorbing alloy having the formula $(La_{0.2}Pr_{0.395}Nd_{0.395}Zr_{0.01})_{0.83}Mg_{0.17}Ni_{3.10}Al_{0.20}Co_{0.1}Fe_{0.03}$ was prepared in the same manner as in Example 1 for use in a negative electrode except that the hydrogen absorbing alloy powder had an average particle diameter of 65 μm. An alkaline storage battery was prepared in the same manner as in Example 8 except that the hydrogen absorbing alloy powder of this example was used.

Example 11

A hydrogen absorbing alloy having the formula $(La_{0.2}Pr_{0.395}Nd_{0.395}Zr_{0.01})_{0.83}Mg_{0.17}Ni_{3.10}Al_{0.20}Co_{0.1}Zn_{0.03}$ was prepared in the same manner as in Example 1 for use in a negative electrode except that the hydrogen absorbing alloy powder had an average particle diameter of 65 μm. An alkaline storage battery was prepared in the same manner as in Example 8 except that the hydrogen absorbing alloy powder of this example was used.

Example 12

A hydrogen absorbing alloy having the formula $(La_{0.2}Pr_{0.395}Nd_{0.395}Zr_{0.01})_{0.83}Mg_{0.17}Ni_{3.10}Al_{0.20}Co_{0.1}Cr_{0.03}$ was prepared in the same manner as in Example 1 for use in a negative electrode except that the hydrogen absorbing alloy powder had an average particle diameter of 65 μm. An alkaline storage battery was prepared in the same manner as in Example 8 except that the hydrogen absorbing alloy powder of this example was used.

Example 13

A hydrogen absorbing alloy having the formula $(La_{0.2}Pr_{0.395}Nd_{0.395}Zr_{0.01})_{0.83}Mg_{0.17}Ni_{3.10}Al_{0.20}Co_{0.1}In_{0.03}$ was prepared in the same manner as in Example 1 for use in a negative electrode except that the hydrogen absorbing alloy powder had an average particle diameter of 65 μm. An alkaline storage battery was prepared in the same manner as in Example 8 except that the hydrogen absorbing alloy powder of this example was used.

Each alkaline storage battery of Examples 8~13 was charged at 1500 mA for 16 hours, and was discharged to a battery voltage of 1.0 V at 300 mA (this charge and discharge cycle is considered one cycle). Charge and discharge of the battery were repeated three times to activate the battery and to obtain a discharge capacity at the third cycle as an initial discharge capacity. The results are shown in Table 5 as an index when the initial discharge capacity of the battery of Example 8 is taken as 100.

The activated batteries of Examples 8~13 were charged at 3000 mA for 12 minutes, charging was continued at 1500 mA until the battery voltage reached the maximum, charging was continued until the battery voltage was reduced 1Q mV, the batteries were left for 20 minutes, then were discharged at 3000 mA to a battery voltage of 0.70 V, and were left for 10 minutes (this charge and discharge cycle is considered one cycle). Charge and discharge of the batteries were repeated, and the number of cycles to reach 60% of the discharge capacity of the initial cycle was measured. The results of cycle life of each battery are shown in Table 5 as an index when the number of cycles to reach 60% of the discharge capacity of the initial cycle of the battery of Example 8 is taken as 100.

TABLE 5

| | Composition of Hydrogen Absorbing Alloy (mol ratio) | Initial Discharge Capacity | Cycle Life |
|---|---|---|---|
| Example 8 | $(La_{0.2}Pr_{0.395}Nd_{0.395}Zr_{0.01})_{0.83}Mg_{0.17}Ni_{3.10}Al_{0.20}Co_{0.1}$ | 100 | 100 |
| Example 9 | $(La_{0.194}Pr_{0.384}Nd_{0.384}Zr_{0.009}Y_{0.029})_{0.835}Mg_{0.165}Ni_{3.01}Al_{0.19}Co_{0.1}$ | 100 | 161 |
| Example 10 | $(La_{0.2}Pr_{0.395}Nd_{0.395}Zr_{0.01})_{0.83}Mg_{0.17}Ni_{3.10}Al_{0.20}Co_{0.1}Fe_{0.03}$ | 100 | 187 |
| Example 11 | $(La_{0.2}Pr_{0.395}Nd_{0.395}Zr_{0.01})_{0.83}Mg_{0.17}Ni_{3.10}Al_{0.20}Co_{0.1}Zn_{0.03}$ | 100 | 140 |
| Example 12 | $(La_{0.2}Pr_{0.395}Nd_{0.395}Zr_{0.01})_{0.83}Mg_{0.17}Ni_{3.10}Al_{0.20}Co_{0.1}Cr_{0.03}$ | 100 | 126 |
| Example 13 | $(La_{0.2}Pr_{0.395}Nd_{0.395}Zr_{0.01})_{0.83}Mg_{0.17}Ni_{3.10}Al_{0.20}Co_{0.1}In_{0.03}$ | 98 | 120 |

As is clear from the results, the alkaline storage battery of Example 9 prepared using the hydrogen absorbing alloy containing Y in the rare earth elements, and the alkaline storage batteries of Examples 10~13 prepared using the hydrogen absorbing alloys containing Fe, Zn, Cr and In, respectively, had further improved cycle life as compared to the battery of Example 8 prepared from the hydrogen absorbing alloy in which such extra elements are not included. The alkaline storage battery of Example 9 prepared using the hydrogen absorbing alloy containing Y, and alkaline storage batteries of Examples 10 and 11 prepared using the hydrogen absorbing alloys containing Fe and Zn, respectively, had especially improved cycle life.

Example 14

A hydrogen absorbing alloy having the formula $(La_{0.5}Pr_{0.245}Nd_{0.245}Zr_{0.01})_{083}Mg_{0.17}Ni_{3.05}Al_{0.15}Co_{0.1}$ was prepared in the same manner as in Example 1 for use in a negative electrode except that the hydrogen absorbing alloy powder had an average particle diameter of 65 μm. An alkaline storage battery was prepared in the same manner as in Example 8 except that the hydrogen absorbing alloy powder of this example was used.

Example 15

A hydrogen absorbing alloy having the formula $(La_{0.5}Pr_{0.23}Nd_{0.23}Zr_{0.01}Y_{0.03})_{0.083}Mg_{0.17}Ni_{3.05}Al_{0.15}Co_{0.1}$ was prepared in the same manner as in Example 1 for use in a negative electrode except that the hydrogen absorbing alloy powder had an average particle diameter of 65 μm. An alkaline storage battery was prepared in the same manner as in Example 8 except that the hydrogen absorbing alloy powder of this example was used.

Example 16

A hydrogen absorbing alloy having the formula $(La_{0.5}Pr_{0.215}Nd_{0.215}Zr_{0.01}Y_{0.06})_{0.83}Mg_{0.17}Ni_{3.05}Al_{0.15}Co_{0.1}$ was prepared in the same manner as in Example 1 for use in a negative electrode except that the hydrogen absorbing alloy powder had an average particle diameter of 65 μm. An alkaline storage battery was prepared in the same manner as in Example 8 except that the hydrogen absorbing alloy powder of this example was used.

Example 17

A hydrogen absorbing alloy having the formula $(La_{0.5}Pr_{0.195}Nd_{0.195}Zr_{0.01}Y_{0.10})_{0.83}Mg_{0.17}Ni_{3.05}Al_{0.15}Co_{0.1}$ was prepared in the same manner as in Example 1 for use in a negative electrode except that the hydrogen absorbing alloy powder had an average particle diameter of 65 μm. An alkaline storage battery was prepared in the same manner as in Example 8 except that the hydrogen absorbing alloy powder of this example was used.

Each alkaline storage battery of Examples 14~17 was charged at 150 mA for 16 hours and then discharged to a battery voltage of 1 V at 300 mA (this charge and discharge cycle is considered one cycle). Three cycles of charge and discharge were repeated to activate the battery.

The activated batteries of Examples 14~17 were charged to reach the maximum battery voltages at 1500 mA, were charged until a battery voltage was reduced 10 mV and then were left for 20 minutes, then the batteries were discharged to 0.70 V at 3000 mA, were left for 10 minutes (this charge and discharge cycle is considered one cycle). 150 Cycles of charge and discharge were repeated.

Each alkaline storage battery was taken apart to get the hydrogen absorbing alloy. Oxygen concentration in the alloy was measured. The results are shown in Table 6 as an index when the oxygen concentration in the alloy of Example 14 is taken as 100.

TABLE 6

| | Composition of Hydrogen Absorbing Alloy (mol ratio) | Oxygen Concentration |
|---|---|---|
| Example 14 | $(La_{0.5}Pr_{0.245}Nd_{0.245}Zr_{0.01})_{0.83}Mg_{0.17}Ni_{3.05}Al_{0.15}Co_{0.1}$ | 100 |
| Example 15 | $(La_{0.5}Pr_{0.23}Nd_{0.23}Zr_{0.01}Y_{0.03})_{0.83}Mg_{0.17}Ni_{3.05}Al_{0.15}Co_{0.1}$ | 94 |
| Example 16 | $(La_{0.5}Pr_{0.215}Nd_{0.215}Zr_{0.01}Y_{0.06})_{0.83}Mg_{0.17}Ni_{3.05}Al_{0.15}Co_{0.1}$ | 97 |
| Example 17 | $(La_{0.5}Pr_{0.195}Nd_{0.195}Zr_{0.01}Y_{0.10})_{0.83}Mg_{0.17}Ni_{3.05}Al_{0.15}Co_{0.1}$ | 91 |

As is clear from the results, the alkaline storage batteries of Examples 15~17 prepared using the hydrogen absorbing alloys containing Y in the rear-earth elements in a range of 0.03~0.10 mol % had lower oxygen concentration than the battery of Example 14 prepared using the hydrogen absorbing alloy in which Y was not contained in the rare earth elements, i.e., the batteries of Examples 15~17 had improved oxidation resistance. The hydrogen absorbing alloy containing Y in the rear-earth elements in an amount of 0.10 mol % had the lowest oxygen concentration and its oxidation resistance was most improved.

What is claimed is:

1. A hydrogen absorbing alloy represented by the formula $Ln_{1-x}Mg_xNi_{y-a-b}Al_aM_b$ (where Ln is at least one element selected from rare earth elements, M is at least one element selected from V, Nb, Ta, Cr, Mo, Mn, Fe, Co, Ga, Zn, Sn, In, Cu, Si, P and B, $0.05 \leq x < 0.20$, $2.8 \leq y \leq 3.9$, $0.10 \leq a \leq 0.25$ and $0 \leq b$), wherein, when said at least one element selected from rare earth elements includes La, a mole ratio of La in said at least one element selected from rare earth elements is not greater than 0.5.

2. The hydrogen absorbing alloy according to claim 1, wherein Y is contained in the rare earth elements.

3. The hydrogen absorbing alloy according to claim 1, further containing Zr.

4. The hydrogen absorbing alloy according to claim 2, further containing Zr.

5. The hydrogen absorbing alloy according to claim 1, wherein an average particle diameter of the alloy is in a range of 65~200 μm.

6. The hydrogen absorbing alloy according to claim 2, wherein an average particle diameter of the alloy is in a range of 65~200 μm.

7. The hydrogen absorbing alloy according to claim 3, wherein an average particle diameter of the alloy is in a range of 65~200 μm.

8. The hydrogen absorbing alloy according to claim 4, wherein an average particle diameter of the alloy is in a range of 65~200 μm.

9. An alkaline storage battery comprising a positive electrode, a negative electrode and an alkaline electrolyte, wherein the negative electrode comprises a hydrogen absorbing alloy represented by the formula $Ln_{1-x}Mg_xNi_{y-a-b}Al_aM_b$ (where Ln is at least one element selected from rare earth elements, M is at least one element selected from V, Nb, Ta, Cr, Mo, Mn, Fe, Co, Ga, Zn, Sn, In, Cu, Si, P and B, $0.05 \leq x < 0.20$, $2.8 \leq y \leq 3.9$ $0.10 \leq a \leq 0.25$ and $0 \leq b$), wherein, when said at least one element selected from rare earth elements includes La, a mole ratio of La in said at least one element selected from rare earth elements is not greater than 0.5.

10. The alkaline storage battery according to claim 9, wherein Y is contained in the rare earth elements of the hydrogen absorbing alloy.

11. The alkaline storage battery according to claim 9, wherein the hydrogen absorbing alloy further contains Zr.

12. The alkaline storage battery according to claim 10, wherein the hydrogen absorbing alloy further contains Zr.

13. The alkaline storage battery according to claim 9, wherein an average particle diameter of the hydrogen absorbing alloy is in a range of 65~200 μm.

14. The alkaline storage battery according to claim 10, wherein an average particle diameter of the hydrogen absorbing alloy is in a range of 65~200 μm.

15. The alkaline storage battery according to claim 11, wherein an average particle diameter of the hydrogen absorbing alloy is in a range of 65~200 μm.

16. The alkaline storage battery according to claim 12, wherein an average particle diameter of the hydrogen absorbing alloy is in a range of 65~200 μm.

17. The alkaline storage battery according to claim 9, wherein the amount of the alkaline electrolyte is 0.31 ml or less per 1g of the hydrogen absorbing alloy.

* * * * *